(12) United States Patent
Hashimoto

(10) Patent No.: US 7,809,358 B2
(45) Date of Patent: Oct. 5, 2010

(54) DATA RECEPTION APPARATUS, DATA RECEPTION METHOD, AND PROGRAM FOR DATA RECEPTION

(75) Inventor: Kiyoshi Hashimoto, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 685 days.

(21) Appl. No.: 11/895,252

(22) Filed: Aug. 23, 2007

(65) Prior Publication Data

US 2008/0051032 A1  Feb. 28, 2008

(30) Foreign Application Priority Data

Aug. 23, 2006  (JP) .............................. 2006-226813

(51) Int. Cl.
*H04M 11/10* (2006.01)
(52) U.S. Cl. ................... 455/412.2; 455/3.04; 455/419; 455/420; 455/556.2; 455/557; 455/41.3; 358/442; 358/1.9; 358/1.15; 358/1.13; 370/445; 370/468
(58) Field of Classification Search .............. 455/412.2, 455/41.3, 3.04, 419, 420, 556.2, 557
See application file for complete search history.

(56) References Cited

U.S. PATENT DOCUMENTS

| | | | | |
|---|---|---|---|---|
| 6,122,072 A | * | 9/2000 | Matsui et al. ................ 358/434 |
| 6,147,765 A | * | 11/2000 | Yoneda ....................... 358/1.15 |
| 6,922,725 B2 | * | 7/2005 | Lamming et al. ........... 709/203 |
| 7,126,716 B1 | * | 10/2006 | Kaufman et al. ........... 358/1.18 |
| 7,370,090 B2 | * | 5/2008 | Nakaoka et al. ............. 709/219 |
| 7,409,434 B2 | * | 8/2008 | Lamming et al. ........... 709/217 |
| 7,487,204 B2 | * | 2/2009 | Asthana et al. ............. 709/203 |
| 7,523,224 B2 | * | 4/2009 | Fukunaga et al. .............. 710/8 |

(Continued)

FOREIGN PATENT DOCUMENTS

EP  1 780 984 A1  5/2007

(Continued)

OTHER PUBLICATIONS

ITX E-Globaledge Corporation and 2 other companies, "Press Release Document," [Online] Aug. 26, 2005, NTT DoCoMo, [search Jul. 17, 2006], "High Speed Infrared Data Communication Method "IrSimple" to the International Standard Standards Adoption."

*Primary Examiner*—Marceau Milord
(74) *Attorney, Agent, or Firm*—Nutter McClennen & Fish LLP; John J. Penny, V

(57) ABSTRACT

The data reception apparatus includes a main processing unit that waits in a standby state so as to be able to receive the connection signal that is transmitted in a first communication mode, and further receives, after reception of the connection signal, the data signal that is transmitted in a second communication mode that is different from the first communication mode; a sub processing unit that is provided in addition to the main processing unit, the sub processing unit being capable of receiving the data signal that is transmitted in the second communication mode; a notification unit that is capable of notifying information to a user; and a notification control unit that controls the notification unit so that the notification unit notifies a communication error to the user if the sub processing unit has received the data signal although the main processing unit has not received the connection signal.

10 Claims, 8 Drawing Sheets

U.S. PATENT DOCUMENTS

| | | | |
|---|---|---|---|
| 7,617,328 B2 * | 11/2009 | Lewis et al. | 709/246 |
| 7,672,278 B2 * | 3/2010 | Gassho et al. | 370/338 |
| 7,689,725 B2 * | 3/2010 | Nakamura | 710/8 |
| 7,756,067 B2 * | 7/2010 | Fujii et al. | 370/310 |
| 2007/0013939 A1 * | 1/2007 | Yoshikawa | 358/1.14 |

FOREIGN PATENT DOCUMENTS

| | | |
|---|---|---|
| EP | 1 848 178 A1 | 10/2007 |
| JP | 59-51637 | 3/1984 |
| WO | WO-2006/080372 A1 | 8/2006 |

* cited by examiner

DATA RECEPTION APPARATUS, DATA RECEPTION METHOD, AND PROGRAM FOR DATA RECEPTION

This application claims benefit under 35 U.S.C. §119 from Japanese Patent Application No. 2006-226813 filed on Aug. 23, 2006, which is hereby incorporated by reference in its entirety.

BACKGROUND

1. Technical Field

The present invention relates to a data reception apparatus, a data reception method, and a program for data reception.

2. Related Art

An infrared (Infrared-ray) data communication scheme conforming to the InfraRed Data Association (IrDA) standard has been widely adopted in a variety of information technology devices such as PDA, personal computers, mobile phones, portable printers and the like. In order to achieve data transfer of large-volume content in a high speed manner (i.e., transfer rate), the IrSimple was adopted as the international communication standard in August 2005 (refer to "ITX E-Globaledge Corporation and two other companies, Press Release, [Online], Aug. 26, 2005, NTT Docomo, Inc., Retrieved on Jul. 17, 2006, the Internet <URL:http://www.nttdocomo.co.jp/info/news_release/page/20050826.html>"). It is expected that the IrSimple standard will be adopted in new applications in addition to conventional ones. The IrSimple standard encompasses communication procedures for not only two-way communication but also one-way communication. For example, the adoption of one-way communication procedures for the purpose of transferring image data from a data transmission apparatus such as a mobile phone, a digital camera, just to name but a few, to a data reception apparatus such as a printer or the like makes it possible for a user to enjoy a high-speed data communication. In such an example, the reception apparatus operates in a standby state that allows the reception apparatus to receive a connection signal that is transmitted at a low speed. Once the reception apparatus receives the slow-transfer-rate connection signal, the reception apparatus can receive data signals that are transmitted in a high speed. In this context, the data signals contain image data.

Disadvantageously, if the user directs the data transmission apparatus to the data reception apparatus at a delayed timing while they intend to perform one-way communication in accordance with the IrSimple standard, the data reception apparatus fails to receive (i.e., cannot receive) the connection signal sent from the data transmission apparatus. If such a failure happens, the data reception apparatus continues to wait for a data connection signal that is sent in a low speed. Therefore, it has been conventionally difficult for the user to conveniently know whether the one-way communication they attempted to perform conforming to the IrSimple standard is successfully processed or not.

SUMMARY

An advantage of some aspects of at least one embodiment of the invention is to provide a data reception apparatus, a data reception method, and a program for data reception that allows a user to know the occurrence of a communication error if a reception apparatus receives signals not from the start but from the middle of a signal sequence due to a mistake in the manipulation of a transmission apparatus by the user in one-way communication in which a connection signal and data signals are transmitted in communication modes (which means manners and/or ways of communication herein) different from each other.

In order to address the above-identified problems without any limitation thereto, a data reception apparatus, a data reception method, and a program for data reception according to at least one embodiment of the invention adopts, for example, any of the following configurations.

A data reception apparatus according to a first aspect of at least one embodiment of the invention is capable of receiving a connection signal and a data signal sent subsequent to the connection signal both of which are transmitted from a communication partner in one-way communication. The data reception apparatus according to the first aspect includes a main processing section that waits in a standby state so as to be able to receive the connection signal that is transmitted in a first communication mode, and further receives, after reception of the connection signal, the data signal that is transmitted in a second communication mode that is different from the first communication mode; a sub processing section that is provided in addition to the main processing section, the sub processing section being capable of receiving the data signal that is transmitted in the second communication mode; a notification section that is capable of notifying information to a user; and a notification control section that controls the notification section so that the notification section notifies a communication error to the user if the sub processing section has received the data signal although the main processing section has not received the connection signal.

In the configuration of the data reception apparatus described above, the notification section is controlled so as to notify a communication error to a user if the sub processing section has received a data signal(s) although the main processing section has not received a connection signal. Therefore, at least one embodiment of the invention allows the user to know the occurrence of the communication error if a reception apparatus receives signals not from the start but from the middle of a signal sequence due to a mistake in the manipulation of a transmission apparatus by the user in one-way communication in which a connection signal and data signals are transmitted in communication modes (which means manners and/or ways of communication herein) different from each other. In this context, the communication mode includes but not limited to a communication speed, a synchronization scheme, and/or a modulation scheme.

In the configuration of the data reception apparatus according to the first aspect described above, it is preferable that the sub processing section is capable of detecting a predetermined pattern contained in the data signal, and the notification control section controls the notification section so that the notification section notifies the communication error to the user if the sub processing section has detected the predetermined pattern although the main processing section has not received the connection signal. With such a configuration, the sub processing section is able to recognize the reception of the data signal(s) without fault. Herein, the predetermined pattern may be a pattern that indicates a preamble. It should be noted that the preamble is a well-known signal that enables the start of frame transmission to be recognized. The preamble gives a cue for synchronization (timing).

In the configuration of the data reception apparatus according to the first aspect of at least one embodiment of the invention described above, it is preferable that the data reception apparatus further includes a printing section that performs printing, and a print control section that controls the printing section so that the printing section performs printing on the basis of image data when the main processing section receives the image data as the data signal after reception of the connection signal. With such a configuration, in comparison with a case where there is no way for a user to know whether the print target image data has successfully been transmitted or not by means of one-way communication other than to monitor whether or not the attempted printing is actually started as it is supposed to be, the invention makes it possible for the user to recognize the success/failure thereof at an earlier timing due to the notification of the occurrence of a communication error.

A data reception method according to a second aspect of at least one embodiment of the invention makes it possible to receive a connection signal and a data signal sent subsequent to the connection signal both of which are transmitted from a communication partner in one-way communication. The data reception method according to the second aspect of at least one embodiment of the invention includes: (a) a main processing section waiting in a standby state so as to be able to receive the connection signal that is transmitted in a first communication mode, and further receiving, after reception of the connection signal, the data signal that is transmitted in a second communication mode that is different from the first communication mode; (b) a sub processing section receiving the data signal that is transmitted in the second communication mode, the step (b) being performed independent of the step (a); and (c) a notification section notifying a communication error to a user if the data signal has been received in the step (b) although the connection signal has not been received in the step (a).

In the operation steps of the data reception method described above, the occurrence of a communication error is notified to a user if the data signal, which is transmitted in the second communication mode, has been received in the step (b) that is performed independent of the step (a) although the connection signal, which is transmitted in the first communication mode, has not been received in the step (a). Therefore, the invention allows the user to know the occurrence of the communication error if a reception apparatus receives signals not from the start but from the middle of a signal sequence due to a mistake in the manipulation of a transmission apparatus by the user in one-way communication in which a connection signal and data signals are transmitted in communication modes (i.e., manners and/or ways of communication) different from each other. In this context, the communication mode includes but is not limited to a communication speed, a synchronization scheme, and/or a modulation scheme. It should be noted that further step(s) may be added to the above basic steps in order to realize operation/working-effects and/or functions that are offered by constituent elements of the data reception apparatus according to the invention described above.

A program according to a third aspect of at least one embodiment of the invention causes each of the operation steps of the data reception method described above to be executed by one or more personal computers. In its practical implementation, such a program may be stored in a computer-readable recording medium (e.g., a hard disk, ROM, FD, CD, DVD, and the like). Alternatively, it may be distributed from one computer to another computer via a transmission medium (a communication network such as the Internet, LAN, or the like). Notwithstanding the above, it may be sent/received through any other alternative medium. With the above program being installed just on one personal computer or on a plurality of personal computers in a distributed topology, each of the operation steps of the data reception method described above is executed by one or more personal computers. Thus, the program according to the third aspect of the invention offers/produces the same operation/working-effects that are achieved by the data reception method according to the second aspect of the invention described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
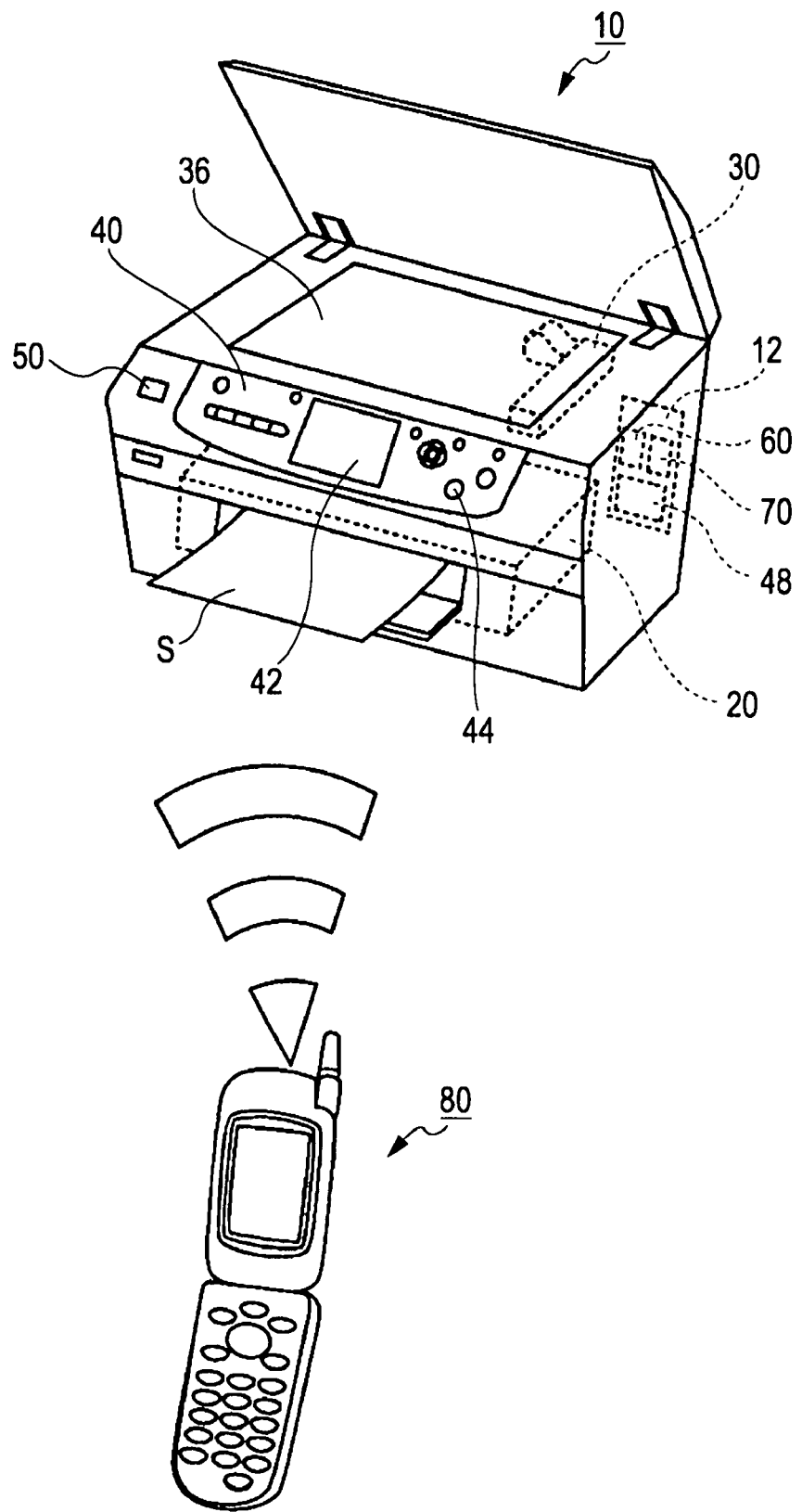
FIG. 1 is an external view that schematically illustrates an example of the overall configuration of a multifunction printer 10.
Figure 2:
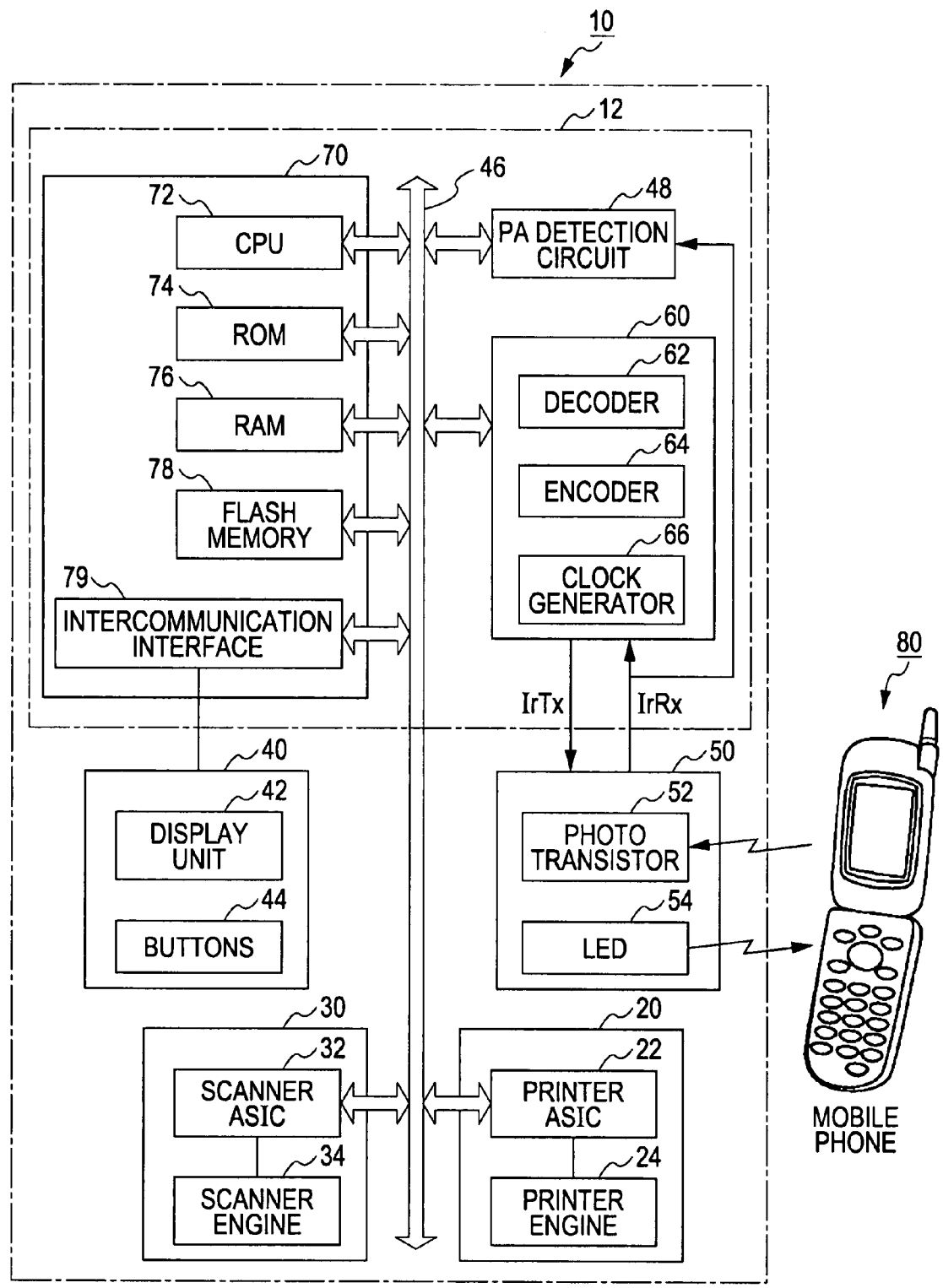
FIG. 2 is a block diagram that schematically illustrates an example of the overall configuration of the multifunction printer 10.

With reference to accompanying drawings, an exemplary embodiment of the present invention is explained below. FIG. 1 is an external view that schematically illustrates the overall configuration of a multifunction printer 10, which is taken as an example of a data reception apparatus according to an embodiment of the invention. FIG. 2 is a block diagram that illustrates an example of the overall configuration of the multifunction printer 10.

As illustrated in FIG. 1, the multifunction printer 10 according to the present embodiment of the invention is provided with a printer unit 20, a scanner unit 30, an infrared (infrared-ray) data communication port 50, an IrDA controller 60, a preamble detection circuit 48, an operation panel 40, and a main controller 70. The printer unit 20 performs printing on a sheet of printing paper S on the basis of a printing job. The scanner unit 30 scans a document that is placed on a glass table 36. The infrared data communication port 50 emits and receives infrared light. The IrDA controller 60 controls the infrared data communication port 50 so as to perform both data transmission and data reception to/from a mobile phone 80, which is taken as an example of various kinds of infrared data communication devices. Or, alternatively, the IrDA controller 60 controls the infrared data communication port 50 so as to perform only data reception from the mobile phone 80. The preamble detection circuit 48 is capable of detecting preambles included in a frame sent from the mobile phone 80. The operation panel 40 displays various kinds of information on a display unit 42. In addition, the operation panel 40 accepts user instructions that are inputted via buttons 44. The main controller 70 is in charge of controlling the entire constituent components of the multifunction printer 10. The IrDA controller 60, the preamble detection circuit 48, and the main controller 70, all of which are mounted on a board 12, are provided inside the multifunction printer 10.

As illustrated in FIG. 2, the multifunction printer 10 is configured such that the printer unit 20, the scanner unit 30, the IrDA controller 60, the preamble detection circuit 48, and the main controller 70 can perform intercommunication of various control signals and/or data therebetween via a bus 46. The infrared data communication port 50 is electrically connected to both of the IrDA controller 60 and the preamble detection circuit 48 so that a signal IrRx, which is outputted from the infrared data communication port 50, is inputted into both of them.

The printer unit 20 is provided with a printer ASIC 22 and a printer engine 24. The printer ASIC 22 is an integrated circuit that is intended for controlling the printer engine 24. When the printer ASIC 22 receives printing instructions from the main controller 70, it controls the printer engine 24 so that the printer engine 24 performs printing on a sheet of printing paper S on the basis of printing data that is designated by the printing command. The printer engine 24 is configured as a well-known ink-jet color printing mechanical structure that performs printing by discharging ink from its print head onto a sheet of paper. Note that the term "ASIC" is an abbreviation for Application Specific Integrated Circuit.

The scanner unit 30 is provided with a scanner ASIC 32 and a scanner engine 34. The scanner ASIC 32 is an integrated circuit that is intended for controlling the scanner engine 34. Upon reception of scanning instructions from the main controller 70, the scanner ASIC 32 controls the scanner engine 34 so that the scanner engine 34 reads a document that is placed on the glass table 36 as a scanning target. The scanner engine 34, which is configured as a well-known image scanner, is provided with a well-known color sensor that splits light reflected from the scanning target document after irradiation thereon into color components of red (R), green (G), and blue (B) so as to obtain a scanned data.

As illustrated in FIGS. 1 and 2, the infrared data communication port 50 is provided on (or near) the surface of the multifunction printer 10 such that a photo-transistor 52 of the infrared data communication port 50 receives infrared light that is emitted from the mobile phone 80 and that an LED 54 thereof emits infrared light to the mobile phone 80. The infrared data communication port 50 is configured to enable data communication to be performed in conformity to the IrDA standard and the IrSimple standard. A communication scheme conforming to the IrDA standard is two-way communication. An example of an IrDA-conforming data communication is described below. In this example, it is assumed that image data of 500 kbyte is transferred from the mobile phone 80 to the multifunction printer 10 in an IrDA-4M data communication scheme. Firstly, "apparatus-detection" procedures (500 msec-1 sec) and "apparatus-connection" procedures (300 msec-500 msec) are performed at 9600 bps. Subsequently, data transfer is carried out while performing two-way communication at 4 Mbps. In the above example, accordingly, it takes approximately three seconds for completion of the entire image transferring process. On the other hand, a communication scheme conforming to the IrSimple standard includes both two-way communication and one-way communication. An example of an IrSimple-conforming one-way data communication is described below. In this example, it is assumed that image data of 500 kbyte is transferred from the mobile phone 80 to the multifunction printer 10 in one way communication. Firstly, the apparatus-connection procedures are performed at 9600 bps. Subsequently, data transfer is carried out as one-way communication at 4 Mbps. In the above example, accordingly, it takes less than one second for completion of the entire image transferring process. It should be noted that both of the photo-transistor 52 and the LED 54 are used for two-way communication while the photo-transistor 52 only is used for one-way communication.

As shown in FIG. 2, the IrDA controller 60 is provided with a decoder 62, an encoder 64, and a clock generator 66. The decoder 62 converts a voltage signal IrRx that is outputted from the infrared data communication port 50 after reception of infrared light by the photo-transistor 52 thereof into a binary data sequence made up of values 0 and 1. On the other hand, the encoder 64 converts a binary data sequence into a voltage signal IrTx that is outputted to the infrared data communication port 50 in order to drive the LED 54 thereof. The clock generator 66 generates a sampling clock that defines the timing of conversion between each of the voltage signals IrRx/IrTx and a binary data sequence. The clock generator 66 is capable of generating different sampling clocks corresponding to two different communication speeds (9600 bps and 4 Mbps in this embodiment). When there is no signal IrRx coming from the infrared data communication port 50, the IrDA controller 60 operates in a standby state under the sampling clock corresponding to 9600 bps generated by the clock generator 66. In such a standby state, the IrDA controller 60 is capable of receiving a signal that is sent at 9600 bps.

Figure 4:
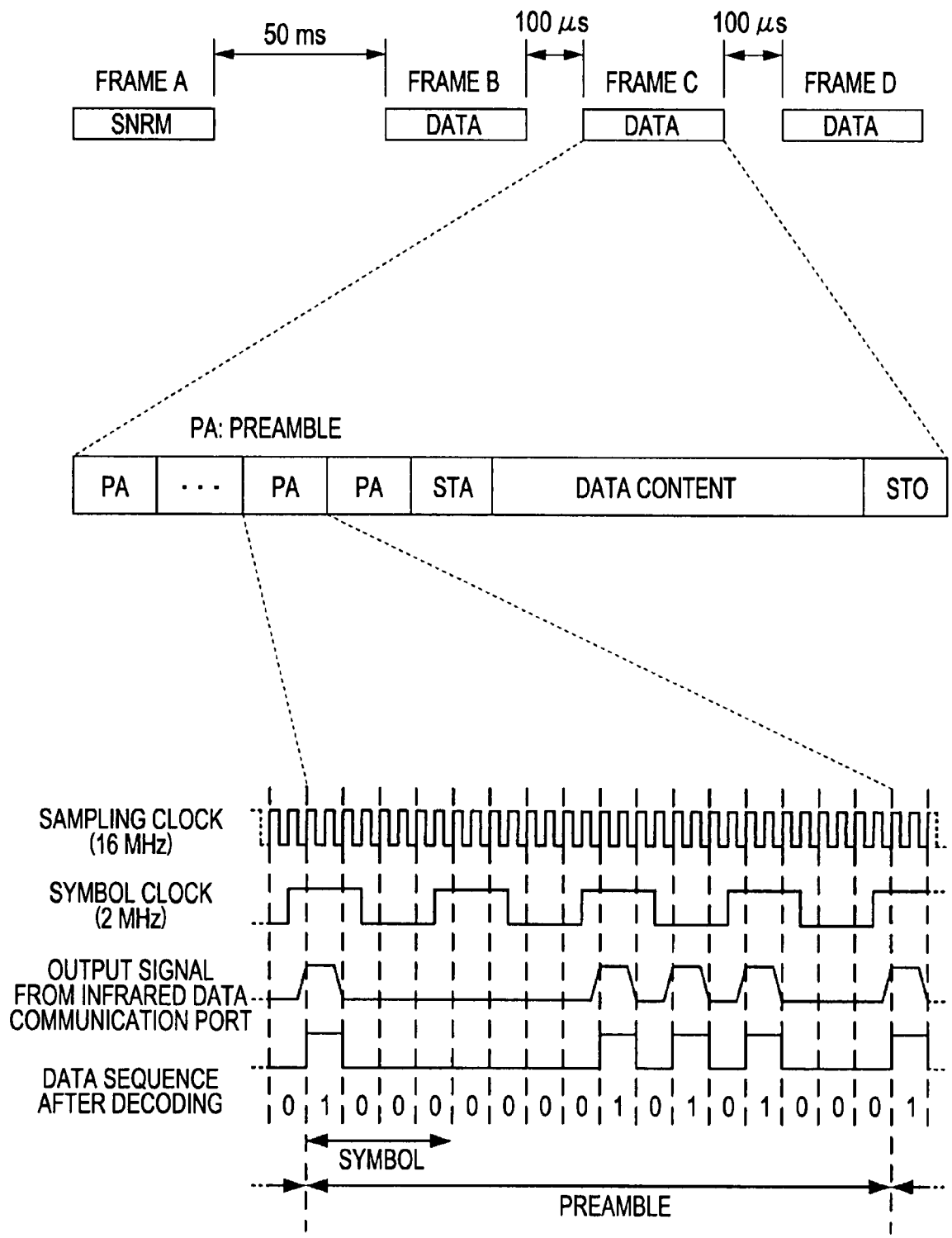
FIG. 4 is a diagram that explains an example of frames that are used for data transfer in one-way communication.

With reference to FIG. 4, one-way communication in conformity to the IrSimple standard is explained below. FIG. 4 is a diagram that explains an example of frames that are used for data transfer in IrSimple one-way communication. Frames used for data transfer include frame A containing an SNRM (Set Normal Response Mode) command functioning as a connection signal, frames B, C, and D containing image data, and a disconnection frame that is not shown in the drawing and used as a disconnection signal. When data is transferred, firstly, the frame A is transferred at 9600 bps. After an interval of 50 msec thereafter, the frame B is transferred at 4 Mbps (actual data transfer rate, which will be described later). Subsequently, after an interval of 100 μsec each, the frame C, and then the frame D, is successively transferred at the same actual data transfer rate of 4 Mbps. The frame C is further described in detail below. A plurality of preambles (PA) is arranged one after another at the front portion of the frame C, which is followed by a start flag (STA), data proper (i.e., data content), and a stop flag (STO) in the order of appearance herein. The data sequence after decoding of each one of the plurality of PA is configured as 16-bit information including "1000", "0000", "1010", and "1000". The data sequence after decoding thereof is obtained as follows. In FIG. 4, a sampling clock of 16 MHz and a symbol clock of 2 MHz, the latter of which is obtained by dividing the counts of pulses of the former, are taken as an example. At each predetermined point in time based on the sampling clock (for example, at the rising edge of each pulse), a signal outputted from the infrared data communication port 50 is read. In this example, it is assumed that the data after decoding processing is recognized as "1" if both of the output signals read at two successive readout points in time (i.e., readout timing) are High, whereas the data after decoding processing is recognized as "0" if both of the output signals read at two successive readout points in time are Low. This means that one data unit after decoding processing is determined for each two cycles of sampling pulses. The communication speed of the data after decoding processing obtained in this way is 8 Mbps. On the other hand, a four-pulse-position-modulation (4 PPM) scheme is employed for the decoded data sequence of data content. Therefore, it is necessary to further decode the decoded data sequence. Specifically, the decoded data sequence "1000" corresponds to actual data "00", whereas the decoded data sequence "0100", corresponds to actual data "01". In addition, the decoded data sequence "0010" corresponds to actual data "10", whereas the decoded data sequence "0001" corresponds to actual data "11". The communication speed (actual data transfer rate) of the data content obtained in this way is 4 Mbps. That is, if the actual data transfer speed is 4 Mbps, the data content is transferred at 4 Mbps, whereas other frame components of PA, STA, and STO are transferred at 8 Mbps. The frequency of the sampling clock for the actual data transfer rate of 4 Mbps agrees with the frequency of the sampling clock for the PA communication speed of 8 Mbps. The symbol clock is adjusted such that, when the aforementioned sixteen bits of the PA are divided into four bits each, the headmost one of each group of the four bits is read at the time of clock generation. The reading of the data content is carried out on the basis of the symbol clock adjusted as above.

The preamble detection circuit 48 (see FIG. 2) is a circuit that is capable of detecting the reception of a signal transmitted at a communication speed of 8 Mbps (which corresponds to the actual data transfer rate of 4 Mbps). The preamble detection circuit 48 is provided with a preamble detection clock generator that is capable of generating a sampling clock having a sampling frequency (16 MHz) corresponding to the communication speed of 8 Mbps. Note that the preamble detection clock generator is not shown in the drawing. The preamble detection circuit 48 reads the signal IrRx, which is received by the photo-transistor 52 of the infrared data communication port 50 and then outputted therefrom, at predetermined points in time (e.g., at the rising edge of each pulse) on the basis of a sampling clock generated by the preamble detection clock generator not shown in the figure. In this example, similar to the aforementioned readout processing performed by the IrDA controller 60, it is assumed that the data after decoding processing is recognized as "1" if both of the output signals read at two successive readout points in time (i.e., readout timing) are High, whereas the data after decoding processing is recognized as "0" if both of the output signals read at two successive readout points in time are Low. This means that one data unit after decoding processing is determined for each two cycles of sampling pulses. The communication speed of the data after decoding processing obtained in this way is 8 Mbps. In addition, the preamble detection circuit 48 has a function to judge whether the obtained data sequence includes one or more PA by comparing the obtained data sequence with the aforementioned PA-indicating specific bit pattern, that is, "1000", "0000", "1010", and thereafter "1000". Further in addition, the preamble detection circuit 48 has a function to send an interruption request signal to the main controller 70 if it is judged that the obtained data sequence includes one or more PA.

The operation panel 40 is provided with the display unit 42 and the buttons 44. An example of the display unit 42 is a liquid crystal display. The display unit 42 displays status information concerning printing, data reception, just to name but a few. The display unit 42 further displays a printing menu or the like. The buttons 44 can comprise a power button, arrow keys, a decision button, a cancellation button, and the like. Upon depressing an appropriate button(s) among the buttons 44 by a user for selection of menu items during printing menu display or at the time of print job execution, user instructions are inputted into the main controller 70 via the intercommunication (i.e., internal communication) interface 79.

As illustrated in FIG. 2, the main controller 70 is configured as a microprocessor having a CPU 72 as its central function unit. In addition to the CPU 72, the main controller 70 further includes a ROM 74 in which various kinds of programs, data, tables, and the like are stored, a RAM 76 which stores scan data and/or print data temporarily and/or memorizes other data, an electrically rewritable flash memory 78 that preserves data without any data loss even when power is cut off, and an intercommunication interface 79 that enables internal communication with the operation panel 40. These components are connected to one another via the bus 46 in such a manner that signals can be sent therebetween. The main controller 70 accepts inputs of various kinds of operation signals and detection signals coming from the printer unit 20, the scanner unit 30, and the IrDA controller 60. The main controller 70 further accepts inputs of operation signals that are generated in accordance with user manipulation of the buttons 44 on the operation panel 40. The main controller 70 functions to issue instructions to the printer unit 20 so that the printer unit 20 carries out printing of image data contained in a print job received from the mobile phone 80. In addition, the main controller 70 issues instructions to the scanner unit 30 so that the scanner unit 30 reads a document that is placed on the glass table 36 as a scanning target on the basis of a scanning command inputted through the buttons 44 on the operation panel 40. The main controller 70 supplies, to the IrDA controller 60, data that is to be transmitted to a transmission destination in infrared data communication. Further in addition, the main controller 70 functions to issue instructions to the operation panel 40 for controlling the display unit 42 thereof.

Figure 3:
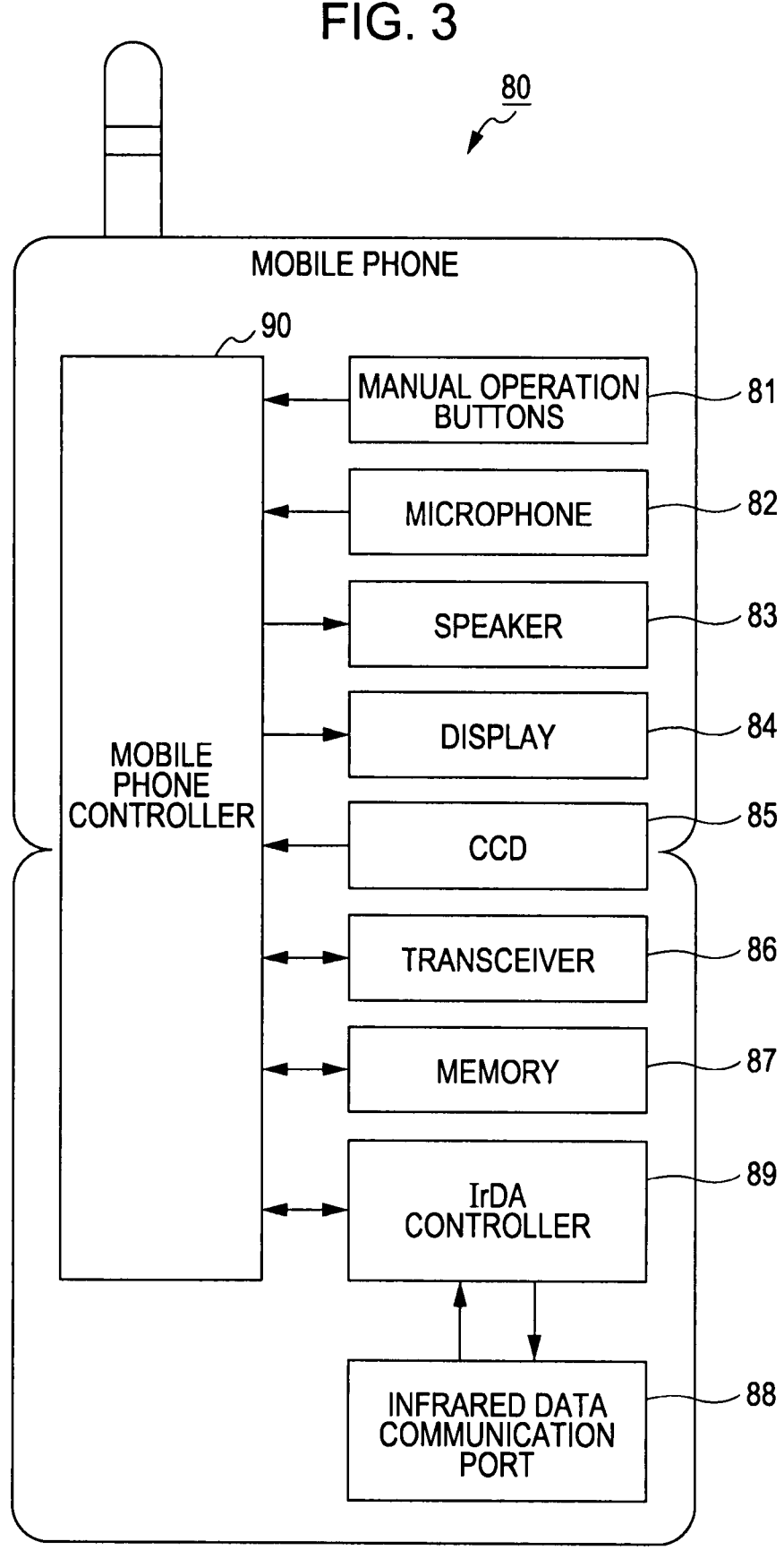
FIG. 3 is a block diagram that schematically illustrates an example of the overall configuration of a mobile phone 80.

The mobile phone 80 has an infrared data communication function in conformity to the IrDA standard and the IrSimple standard. As illustrated in FIG. 3, the mobile phone 80 is provided with manual operation buttons 81 that include numeric keypads or the like, a microphone 82 that picks up a voice of a user uttered at a mouthpiece thereof, a speaker 83 that outputs a voice to the outside via an earpiece thereof, a display screen 84 that shows a variety of displays (images), a CCD camera 85 that picks up images, a transceiver (i.e., transmission/reception unit) 86 that functions as a data input/output interface for connection to a mobile phone network, a memory 87 that can store various kinds of data temporarily, an infrared data (i.e., infrared ray) communication port 88 that emits/receives infrared light, an IrDA controller 89 that controls the infrared data communication port 88 so as to perform data transmission/reception to/from an external infrared data communication device such as the multifunction printer 10, and a mobile phone controller 90 that is in charge of controlling the entire constituent components of the mobile phone 80. A variety of data is stored in the memory 87, including without any limitation thereto, telephone directory data created by manipulating the manual operation buttons 81, transmission e-mail data that has been transmitted or that is waiting to be transmitted to other mobile phone(s) and/or personal computer(s) or the like via the transceiver 86, reception e-mail data that has been received from other mobile phone(s) and/or personal computer(s) or the like via the transceiver 86, notepad data created by manipulating the manual operation buttons 81, and image data picked up (i.e., photographed) by the CCD camera 85. The configurations of the infrared data communication port 88 and the IrDA controller 89 of the mobile phone 80 are the same as the infrared data communication port 50 and the IrDA controller 60 of the multifunction printer 10. The mobile phone controller 90 performs various kinds of control. As one of various control functions thereof, when a user depresses a button(s) among the manual operation buttons 81 to which "Ir high-speed transmission" is assigned so as to input transmission instructions for one-way communication in conformity to the IrSimple standard, the mobile phone controller 90 transmits one or more image data selected from among a pool of image data stored in the memory 87 to the multifunction printer 10 via the infrared data communication port 88 and the IrDA controller 89 described above.

Next, an explanation is given below of the operations of the multifunction printer 10 and the mobile phone 80 according to the present embodiment of the invention having the configuration described above. In particular, in the following description of an operation example, it is assumed that the mobile phone 80 transmits image data to the multifunction printer 10 by means of one-way communication in conformity to the IrSimple standard, which is followed by the printing of the received image data at the multifunction printer 10.

Figure 5:
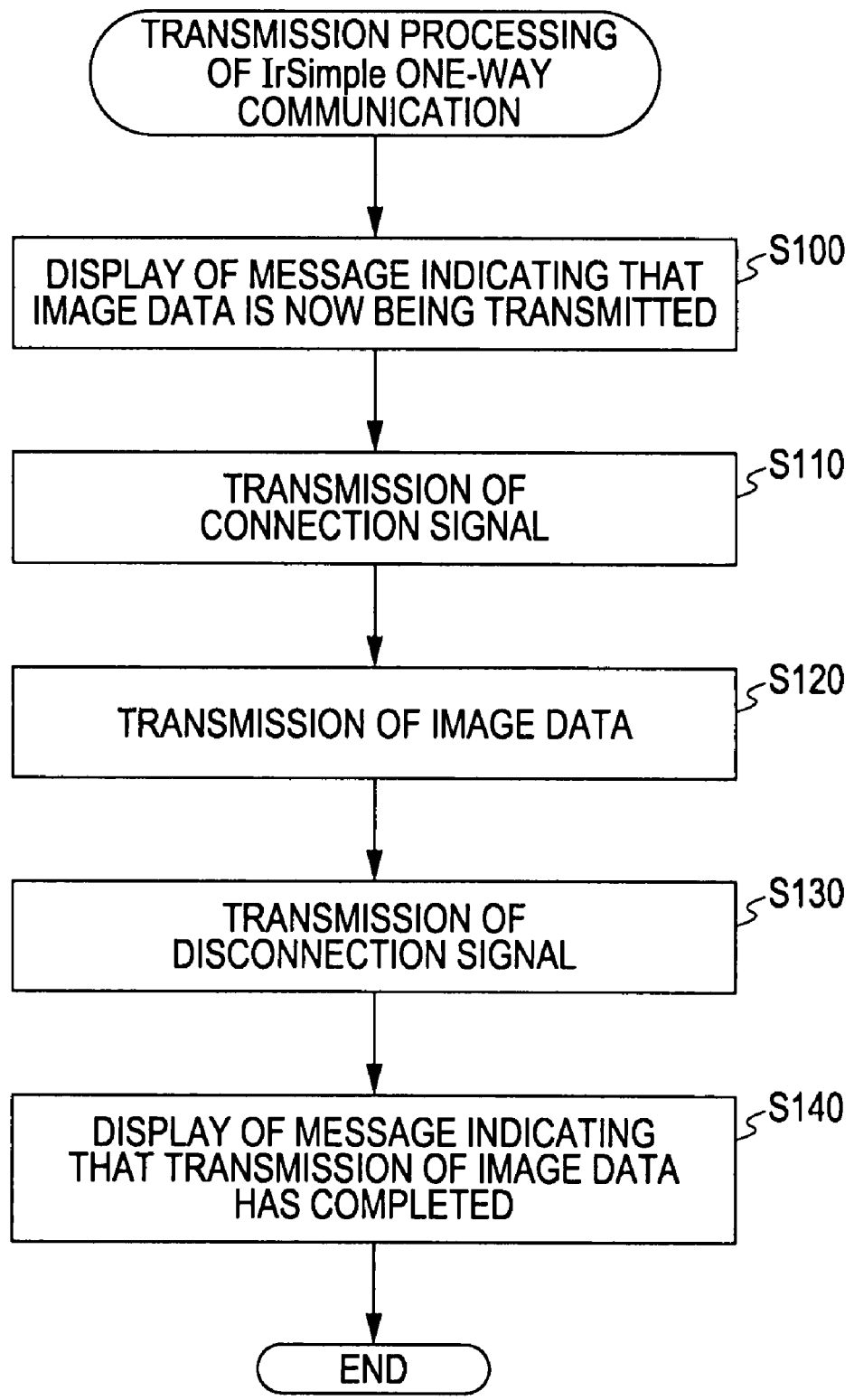
FIG. 5 is a flowchart that illustrates an example of a transmission processing routine of one-way communication.
Figure 6:
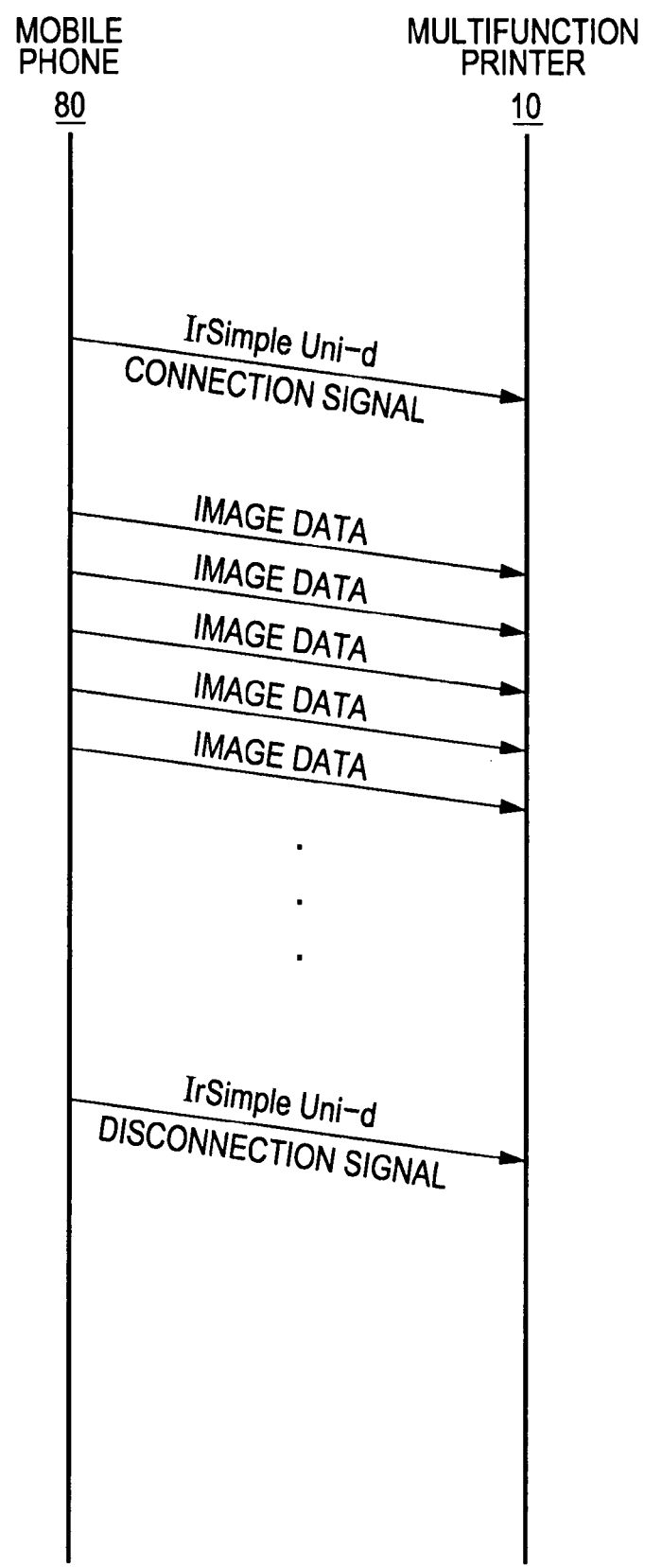
FIG. 6 is a sequence chart that illustrates an example of communication procedures carried out when communication is successfully performed "from the start."

First of all, the operations of the mobile phone 80 are explained below. FIG. 5 is a flowchart that illustrates an example of a transmission processing routine of the IrSimple one-way communication that is performed by the mobile phone controller 90 of the mobile phone 80. FIG. 6 is a sequence chart that illustrates an example of communication procedures carried out in a case where the mobile phone controller 90 of the mobile phone 80 performs the transmission processing routine of the IrSimple one-way communication so as to establish a successful "from-the-start" connection between the mobile phone 80 and the multifunction printer 10. The processing routine described above is stored in an internal ROM, which is not shown in the drawing, of the mobile phone 80. This processing routine is executed when a user depresses, after selection of an image(s) that is to be printed through manipulation of the numeric keypads, which is not shown in the drawing, or the like of the manual operation buttons 81 of the mobile phone 80, a button(s) not shown in the drawing among the manual operation buttons 81 to which "Ir high-speed transmission" is assigned. When the transmission processing routine of the IrSimple one-way communication, which is shown in FIG. 5, is initiated, the mobile phone controller 90 of the mobile phone 80 displays, firstly, a message indicating that image data is now being transmitted on the display screen 84 (step S100). Then, the mobile phone controller 90 controls the IrDA controller 89 so that a frame containing an SNRM command, which functions as a connection signal, is transmitted at an actual data transfer rate of 9600 bps (step S110). Subsequently, after elapse of a predetermined time period (e.g., 50 ms), the mobile phone controller 90 controls the IrDA controller 89 so that a frame containing user-selected image data is transmitted at an actual data transfer rate of 4 Mbps (step S120). After completing the transmission of the frames containing pieces of image data, the mobile phone controller 90 controls the IrDA controller 89 so that a disconnection frame is transmitted (step S130). Thereafter, the mobile phone controller 90 displays a message indicating that the transmission of the image data has completed on the display screen 84 (step S140) so as to end the processing routine. As described above, under one-way communication, the transmission of image data is carried out with no particular attention to the current reception state of the multifunction printer 10. FIG. 6 illustrates the communication procedures thereof. As it is clear from the drawing, no data indicating the current reception status of the multifunction printer 10 is sent from the multifunction printer 10 to the mobile phone 80 at all.

Figure 7:
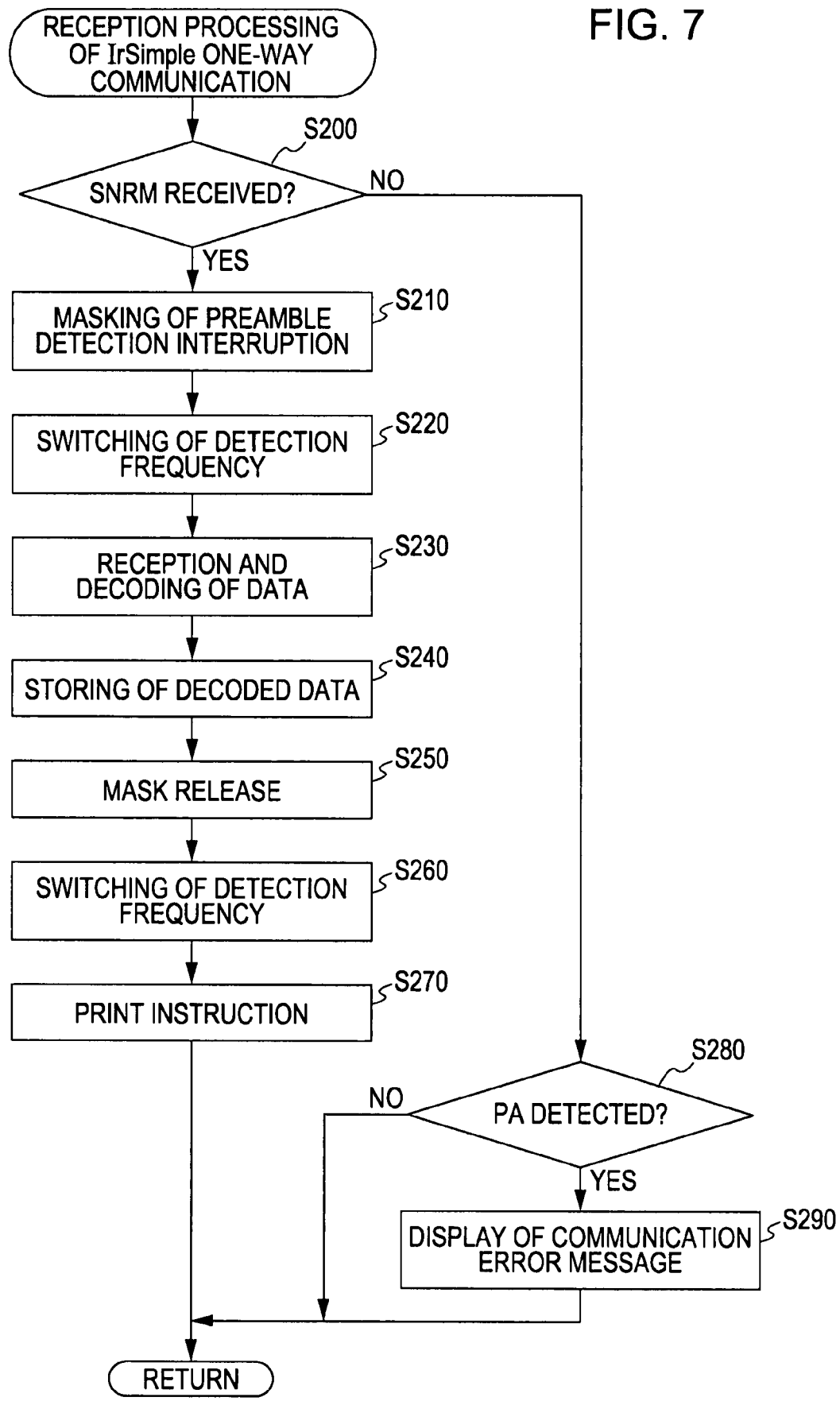
FIG. 7 is a flowchart that illustrates an example of a reception processing routine of one-way communication.

Next, the operations of the multifunction printer 10 are explained below. FIG. 7 is a flowchart that illustrates an example of a reception processing routine of the IrSimple one-way communication that is performed by the CPU 72 of the multifunction printer 10. The above routine is stored in the ROM 74 of the multifunction printer 10 (see FIG. 4). This routine is executed when power is turned ON; and thereafter, it is repetitively performed at predetermined time intervals (e.g., every several milliseconds). It should be noted that the sampling clock of the clock generator 66 is adjusted such that the multifunction printer 10 can receive data at the communication speed of 9600 bps in a reception standby state. When this routine is started, as the first step, the CPU 72 of the multifunction printer 10 judges whether a frame containing an SNRM command has been received or not (step S200). Since the frame containing the SNRM command (the frame A in FIG. 4) is transmitted from the mobile phone 80 at the bit rate of 9600 bps, the IrDA controller 60 is capable of converting the received frame into original binary data. Generally speaking, infrared radiation (i.e., infrared ray) emitted from the mobile phone 80 has strong directional characteristics. For this reason, the multifunction printer 10 can successfully receive the frame containing the SNRM command only when the frame containing the SNRM command is transmitted from the mobile phone 80 to the multifunction printer 10 when the mobile phone is directed at an appropriate angle toward the multifunction printer 10 with no obstacle existing between the mobile phone 80 and the multifunction printer 10. Otherwise, the multifunction printer 10 fails to receive the frame containing the SNRM command.

If it is judged that the frame containing the SNRM command has been received in the step S200, the masking of any possible interruption requested by the preamble detection circuit 48 is performed (step S210). The masking processing makes it possible to carry out subsequent processing steps regardless of the presence/absence of any interruption request signal outputted from the preamble detection circuit 48. In addition to the above masking processing, if it is judged that the frame containing the SNRM command has been received in the step S200, a memory space for image spooling is allocated in the RAM 76. Subsequently, in order to receive frames containing data content (that is, the frame B, the frame C, and the frame D in FIG. 4), the frequency of the sampling clock is switched over (step S220). Specifically, the frequency of the sampling clock outputted from the clock generator 66 is changed to a frequency that enables a signal that is sent at the actual data transfer rate of 4 Mbps to be received (16 MHz). Next, frames containing the data content are transmitted one after another with 100 µs interval each therebetween. The received frames containing the data content are converted into original binary data (step S230). As has already been described, when the frames containing the data content are received, the signals IrRx that are outputted from the infrared data communication port 50 and then read at each two successive readout points in time (i.e., readout timing) on the basis of the sampling clock are converted into one binary data, which is performed successively to obtain the converted binary data. As for the data content, the decoded data sequence is further subjected to decoding by employing the 4 PPM scheme so as to convert it into the original binary data. Then, the converted data is stored in the RAM 76 of the multifunction printer 10 (step S240). After the last frame containing the data content, a disconnection frame indicating the termination of communication is transmitted from the mobile phone 80. Accordingly, the above-described data reception processing ends at the time of reception of the disconnection frame. Thereafter, the masked interruption of the preamble detection circuit 48 is "de-masked" (i.e., released) (step S250). Then, the frequency of the sampling clock is switched back to the initial frequency at which data sent at the communication speed of 9600 bps can be received. This is done so in order to put the multifunction printer 10 back into an initial standby state in which the multifunction printer 10 can receive a frame containing an SNRM command functioning as a connection signal (step S260). Subsequently, the printer ASIC 22 receives instructions to perform printing on the basis of a print job contained in the data content stored in the RAM 76 (step S270) to end a series of the processing steps described above. Upon reception of the printing instructions, the printer ASIC 22 controls the printer engine 24 so that printing on the paper S is carried out on the basis of the print job.

Figure 8:
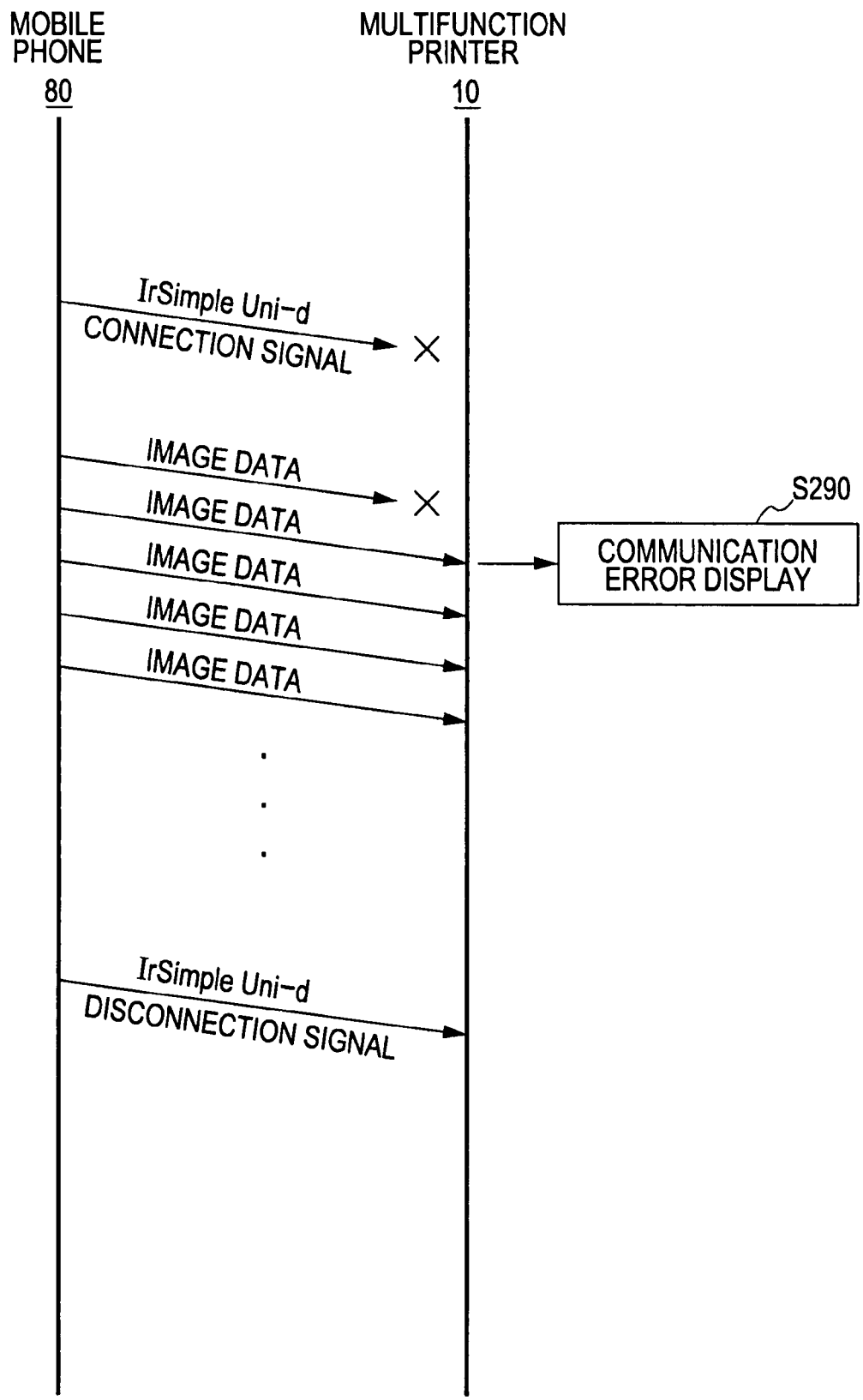
FIG. 8 is a sequence chart that illustrates an example of communication procedures carried out when communication is not successfully performed "from the start".

In the other hand, if it is judged that the frame containing the SNRM command has not been received in the step S200, it is further judged whether the PA has been detected or not (step S280). In this context, a case where it is judged that the frame containing the SNRM has not been received is not limited to a situation where a user did not depress a button(s) not shown in the drawing to which "Ir high-speed transmission" is assigned. Other than such a situation, the transmission of the frame containing the SNRM is not recognized when the frame containing the SNRM, which has actually been sent out, does not reach the infrared data communication port 50 of the multifunction printer 10 because, for example, the infrared data communication port 88 of the mobile phone 80 is not directed at an appropriate angle toward the infrared data communication port 50 of the multifunction printer 10, or because there is some obstacle therebetween. In this embodiment of the invention, whether one or more PA has been detected or not is judged on the basis of the presence/absence of any interruption request signal supplied from the preamble detection circuit 48 to the main controller 70. That is, when one or more PA is contained in the signal IrRx outputted from the infrared data communication port 50, an interruption request signal is supplied from the preamble detection circuit 48 to the main controller 70. For example, it is assumed that the multifunction printer 10 failed to catch a frame containing an SNRM command because the mobile phone 80 is not directed at an appropriate angle toward the infrared data communication port 50 of the multifunction printer 10 or because there is some obstacle therebetween at the start of a series of communication. It is further assumed, however, that the multifunction printer 10 has now become able to receive subsequent frames containing PA(s) and data content because the mobile phone 80 gets directed at an appropriate angle toward the infrared data communication port 50 of the multifunction printer 10 or the obstacle is removed from the middle of communication. In such a case, a positive judgment (YES) is made at the step 280. When it is judged that a PA has been detected, the display unit 42 is controlled so as to display a message indicating the occurrence of a communication error in step S290 (for example, a character string that reads "A communication error has occurred."). Then, the processing routine is ended. On the other hand, if it is judged that no PA has been detected, the processing routine is ended. FIG. 8 is a sequence chart that illustrates an example of communication procedures carried out in a case where, as described in the above example, the IrDA controller 60 does not receive any frame containing an SNRM command (the step S200: No), and thereafter, the preamble detection circuit 48 receives frames containing data content (the step S280: Yes).

Next, the relationships (i.e., correspondence) between the specific constituent elements described in the above exemplary embodiment and the generic constituent elements of the invention are made clear. A set of the infrared data communication port 50 and the IrDA controller 60 described in the above exemplary embodiment corresponds to a main processing section of the invention, whereas a set of the infrared data communication port 50 and the preamble detection circuit 48 described in the above exemplary embodiment corresponds to a sub processing section of the invention. The display unit 42 described in the above exemplary embodiment corresponds to a notification section of the invention. The main controller 70 described in the above exemplary embodiment corresponds to a notification control section of the invention. The printer engine 24 described in the above exemplary embodiment corresponds to a printing section of the invention, whereas the printer ASIC 22 described in the above exemplary embodiment corresponds to a print control section of the invention. It should be noted that, in the above exemplary embodiment, an example of a data reception method according to the invention is specifically described while explaining the operations of the multifunction printer 10.

In the configuration of the multifunction printer 10 according to the exemplary embodiment of the invention described above, the display unit 42 is controlled so as to display a message indicating the occurrence of a communication error when the preamble detection circuit 48 receives a frame(s) containing data content in a condition where the IrDA controller 60 has not received a frame containing an SNRM command. Therefore, in one-way communication conforming to the IrSimple standard in which a frame containing an SNRM command is transmitted/received at a communication speed different from that used for transmission of frames containing data content, the invention makes it possible to notify the occurrence of a communication error to a user when a series of signals are received from the middle of the IrSimple-conforming one-way communication due to an operational mistake made by the user.

Since the preamble detection circuit 48 is configured to detect preambles included in frames containing data content, the preamble detection circuit 48 is able to recognize the reception of the frame(s) containing data content without fault.

In addition, in comparison with a case where there is no way for a user to know whether the print target image data has successfully been transmitted or not by means of one-way communication conforming to the IrSimple standard other than to monitor whether or not the attempted printing to be carried out by the printer engine 24 is actually started as it is supposed to be, the invention makes it possible for the user to recognize the success/failure thereof at an earlier timing because a message indicating the occurrence of a communication error is displayed on the display unit 42.

Needless to say, the invention is in no case restricted to the exemplary embodiment described above. The invention may be configured in an adaptable manner in a variety of variations or modifications without departing from the spirit thereof as long as they fall within the technical scope thereof.

For example, although it is described in the exemplary embodiment of the invention described above that the multifunction printer 10 recognizes data transmission by detecting a predetermined pattern that indicates a preamble that is included in a frame containing data content by means of the preamble detection circuit 48, the invention is not limited to such a specific example that detects the predetermined pattern indicating a preamble. That is, the mode of detection may be adapted as long as it can recognize data transmission. For example, the invention may be modified such that the multifunction printer 10 (data reception apparatus) recognizes data transmission by detecting a signal indicating data content.

In the exemplary embodiment of the invention described above, it is explained that a connection signal and subsequent data signals are transmitted at communication speeds different from each other, where the communication speed is taken as an example of various kinds of communication modes. Notwithstanding the above, the invention is not limited to such a specific example that employs the different communication speeds. For example, the connection signal and the subsequent data signals may be transmitted in synchronization schemes different from each other as another example of various kinds of communication modes. Or, the connection signal and the subsequent data signals may be transmitted in modulation schemes different from each other as still another example thereof. If such a modified configuration is adopted, the multifunction printer 10 (data reception apparatus) is provided with a data signal reception circuit that is in accordance with the synchronization scheme and/or the modulation scheme employed for a data signal in place of the preamble detection circuit 48.

In the exemplary embodiment of the invention described above, it is explained that the display unit 42 is controlled so as to display a message indicating the occurrence of a communication error in the step S290 illustrated in FIG. 7. Notwithstanding the above, the invention is not limited to such a specific example but may be modified as long as the modified configuration notifies the occurrence of the communication error to a user in any alternative manner. For example, the display unit 42 may be controlled so as to display a message that requests a user to redirect the mobile phone 80 to the infrared data communication port 50 at an appropriate angle and then to perform image data transmission again because the multifunction printer 10 has failed to receive the transmitted data. As another alternative examples, the invention may be modified such that a voice message is outputted from speakers and/or that a lamp lights up upon occurrence of a communication error either in place of the display unit 42 or in addition to the display unit 42.

In the exemplary embodiment of the invention described above, it is explained that, in the reception processing routine of the IrSimple one-way communication, the reception processing routine is ended immediately after displaying a message indicating the occurrence of a communication error in the step S290. Notwithstanding the above, the invention is not limited to such a specific example but may be modified to perform reception preparation processing after displaying the message indicating the occurrence of a communication error in the step S290, and then end the reception processing routine. In addition, the invention may be further modified to skip the reception preparations if a user retransmits, after performing the reception preparation processing and then terminating the reception processing routine, data from the mobile phone 80 successfully after initial failure such that the IrDA controller 60 of the multifunction printer 10 receives a frame containing an SNRM command. A few examples of the reception preparations mentioned above are processing for allocation of a memory space for image spooling in the RAM 76, processing for interruption of in-process tasks, and processing for prohibition of other task initiation.

In the exemplary embodiment of the invention described above, the mobile phone 80 is taken as an example of various kinds of data transmission apparatuses just for the purpose of explanation herein. However, the invention is not limited to such a specific example. Other than the mobile phone, a digital still camera, a video camera, or a personal computer, without any limitation thereto, may be used as a data transmission apparatus that communicates with a data reception apparatus according to the invention. Similarly, in the exemplary embodiment of the invention described above, the multifunction printer 10 is taken as an example of various kinds of data reception apparatuses just for the purpose of explanation herein. However, the invention is not limited to such a specific example. Other than the multifunction printer, a television, audio equipment, another mobile phone other than the mobile phone 80, a personal computer, without any limitation thereto, may be used as a data reception apparatus according to the invention. Moreover, in the exemplary embodiment of the invention described above, image data is taken as an example of various kinds of information that is transmitted in one-way communication conforming to the IrSimple standard just for the purpose of explanation herein. However, the invention is not limited to such a specific example. That is, information other than image data, for example, music data, may be transmitted in the IrSimple one-way communication.

Furthermore, in the exemplary embodiment of the invention described above, infrared ray is taken as an example of various kinds of communication media that realizes one-way communication just for the purpose of explanation herein. However, the invention is not limited to such a specific example. As an example of an alternative communication medium, radio wave may be adopted as a means for carrying out one-way communication. As another alternative communication medium, a cable may be used for one-way communication.

What is claimed is:

1. A data reception apparatus that is capable of receiving a connection signal and a data signal sent subsequent to the connection signal both of which are transmitted from a communication partner in one-way communication, the data reception apparatus comprising:
a main processing section that waits in a standby state so as to be able to receive the connection signal that is transmitted in a first communication mode, and further receives, after reception of the connection signal, the data signal that is transmitted in a second communication mode that is different from the first communication mode;
a sub processing section that is provided in addition to the main processing section, the sub processing section being capable of receiving the data signal that is transmitted in the second communication mode;
a notification section that is capable of notifying information to a user; and
a notification control section that controls the notification section so that the notification section notifies a communication error to the user if the sub processing section has received the data signal although the main processing section has not received the connection signal.

2. The data reception apparatus according to claim 1, wherein the sub processing section is capable of detecting a predetermined pattern contained in the data signal, and the notification control section controls the notification section so that the notification section notifies the communication error to the user if the sub processing section has detected the predetermined pattern although the main processing section has not received the connection signal.

3. The data reception apparatus according to claim 2, wherein the predetermined pattern is a pattern that indicates a preamble.

4. The data reception apparatus according to claim 1, wherein the first and second communication modes are communication speeds.

5. The data reception apparatus according to claim 1, further comprising a printing section that performs printing, and a print control section that controls the printing section so that the printing section performs printing on the basis of image data when the main processing section receives the image data as the data signal after reception of the connection signal.

6. The data reception apparatus according to claim 1, wherein the first and second communication modes are synchronization schemes.

7. The data reception apparatus according to claim 1, wherein the first and second communication modes are modulation schemes.

8. The data reception apparatus according to claim 1, wherein said notification section is selected from the group comprising a display section, speaker, and lamp.

9. A data reception method for receiving a connection signal and a data signal sent subsequent to the connection signal both of which are transmitted from a communication partner in one-way communication, the data reception method comprising:
   (a) a main processing section waiting in a standby state so as to be able to receive the connection signal that is transmitted in a first communication mode, and further receiving, after reception of the connection signal, the data signal that is transmitted in a second communication mode that is different from the first communication mode;
   (b) a sub processing section receiving the data signal that is transmitted in the second communication mode, the step (b) being performed independent of the step (a); and
   (c) a notification section notifying a communication error to a user if the data signal has been received in the step (b) although the connection signal has not been received in the step (a).

10. A program that causes the data reception method according to claim 6 to be executed by one or more personal computer.

* * * * *